(12) United States Patent
Forster et al.

(10) Patent No.: US 10,540,914 B2
(45) Date of Patent: Jan. 21, 2020

(54) LABEL ASSEMBLY

(71) Applicants: Avery Dennison Retail Information Services, LLC, Westborough, MA (US); Marks and Spencer Plc, London (GB)

(72) Inventors: Ian J. Forster, Essex (GB); Peter Cockerell, Buckinghamshire (GB)

(73) Assignee: AVERY DENNISON RETAIL INFORMATION SERVICES LLC, Mentor, OH (US)

(*) Notice: Subject to any disclaimer, the term of this patent is extended or adjusted under 35 U.S.C. 154(b) by 0 days.

(21) Appl. No.: 15/204,097

(22) Filed: Jul. 7, 2016

(65) Prior Publication Data
US 2017/0011664 A1 Jan. 12, 2017

Related U.S. Application Data

(60) Provisional application No. 62/189,668, filed on Jul. 7, 2015.

(51) Int. Cl.
*G09F 3/04* (2006.01)
*G09F 3/02* (2006.01)
(Continued)

(52) U.S. Cl.
CPC .......... *G09F 3/02* (2013.01); *G06K 7/10366* (2013.01); *G09F 3/0289* (2013.01); *G09F 3/0297* (2013.01); *G09F 3/10* (2013.01); *G09F 3/04* (2013.01); *G09F 2003/0201* (2013.01); *G09F 2003/0222* (2013.01);
(Continued)

(58) Field of Classification Search
CPC . G09F 3/02; G09F 3/0289; G09F 3/10; G09F 2003/0201; G09F 2003/002; G09F 2003/0239; G09F 2003/0257; G09F 2003/0264; G09F 2003/0267; B42D 5/003
See application file for complete search history.

(56) References Cited

U.S. PATENT DOCUMENTS 5,264,265 A * 11/1993 Kaufmann ............ G09F 3/0288
  283/80
5,286,546 A *  2/1994 Su .......................... B42D 5/003
  281/15.1
(Continued)

FOREIGN PATENT DOCUMENTS

DE  102013107410   1/2015
JP  2010/046361    3/2010
(Continued)

OTHER PUBLICATIONS

International Search Report and Written Opinion of ISA/EPO prepared for PCT/US2016/041252 dated Sep. 26, 2016.
(Continued)

*Primary Examiner* — Cassandra Davis
(74) *Attorney, Agent, or Firm* — Avery Dennison Retail Information Services LLC

(57) ABSTRACT

The present disclosure relates generally to methods and system for creating a multiple part peel and reseal label assembly that may include one or more RFID devices for use in providing information to potential end users. The assembly may be provided with a plurality of informational sheets or layers that may be printed with fixed or variable information.

9 Claims, 9 Drawing Sheets

(51) Int. Cl.
*G09F 3/00* (2006.01)
*G06K 7/10* (2006.01)
*G09F 3/10* (2006.01)

(52) U.S. Cl.
CPC ............... *G09F 2003/0239* (2013.01); *G09F 2003/0257* (2013.01); *G09F 2003/0264* (2013.01); *G09F 2003/0267* (2013.01); *G09F 2003/0282* (2013.01)

(56) References Cited

U.S. PATENT DOCUMENTS

| | | | | |
|---|---|---|---|---|
| 5,672,224 | A * | 9/1997 | Kaufmann | G09F 3/0288 156/197 |
| 6,254,960 | B1 * | 7/2001 | Chen | B42D 5/003 428/192 |
| 6,637,775 | B1 * | 10/2003 | Bernier | B65D 23/14 283/94 |
| 6,777,055 | B2 * | 8/2004 | Janssen | B32B 7/06 428/41.8 |
| 7,425,898 | B2 * | 9/2008 | Ryckman | G06K 19/07758 235/376 |
| 7,875,142 | B2 * | 1/2011 | Matthews | B65C 3/163 156/156 |
| 2003/0091819 | A1 * | 5/2003 | Franko, Sr. | G09F 3/0288 428/343 |
| 2004/0041392 | A1 | 3/2004 | Seidl | |
| 2004/0211510 | A1 | 10/2004 | Franko | |
| 2004/0228996 | A1 * | 11/2004 | Franzo | B31D 1/021 428/40.1 |
| 2006/0267572 | A1 * | 11/2006 | Sellars | G06K 19/07745 324/90 |
| 2007/0218236 | A1 * | 9/2007 | Klein | B29C 49/24 428/40.1 |
| 2009/0167502 | A1 * | 7/2009 | Erickson | G06K 7/0008 340/10.3 |
| 2009/0201157 | A1 * | 8/2009 | Forster | G06K 19/07749 340/572.7 |
| 2011/0259775 | A1 | 10/2011 | Bratter et al. | |
| 2012/0268837 | A1 * | 10/2012 | Rittenburg | G02B 3/08 359/742 |
| 2015/0118714 | A1 * | 4/2015 | Kan | C12N 15/67 435/91.1 |
| 2016/0379022 | A1 * | 12/2016 | Elizondo, II | G06K 7/10366 340/10.1 |

FOREIGN PATENT DOCUMENTS

| | | |
|---|---|---|
| WO | 2006/094152 | 9/2006 |
| WO | 2017007880 | 1/2017 |

OTHER PUBLICATIONS

International Search Report and Written Opinion of ISA/EPO prepared for PCT/US2018/060579 dated Feb. 14, 2019.

* cited by examiner

LABEL ASSEMBLY

CROSS-REFERENCE TO RELATED APPLICATION

The present application claims the benefit of U.S. Provisional Patent Application No. 62/189,668 filed Jul. 7, 2015, which is incorporated herein by reference in its entirety.

BACKGROUND OF THE INVENTION

Conventional labels, including pressure sensitive labels, are manufactured from label stock that typically includes a substrate or face layer (facestock), an adhesive layer adhered to the face layer and a protective release liner removably adhered to the adhesive layer. The label stock is generally provided in a continuous format or roll form. Individual labels may be produced by die cutting the face layer and the adhesive layer, and then removing the surrounding waste matrix, leaving the individual labels adhered to the release liner. However, labels formed in such a fashion may have only a single functional layer, that is, only a single layer on which information can be printed.

It is also sometimes required to construct a set of individual labels with different text information, such as languages, into a stack for attachment to an object. It is known to have one of the labels to contain a far field long range RFID device; however, it is not possible to use multiple far field RFID devices as they interact strongly and de-tune each other. Having multiple devices in the label may be desirable to determine whether all labels are present or if they individually relate to different parts of a structure. For example, it may be required to create a kit of parts in a common box; the label from each part is removed and combined in the common stack carrying the identity of all of the component elements. Alternatively, it may be needed to determine that all of the labels expected to be in the stack are present without dismantling the stack.

SUMMARY OF THE INVENTION

The present disclosure relates generally to methods and system for creating a multiple part peel and reseal label assembly that may include one or more RFID devices for use in providing information to potential end users. The assembly may be provided with a plurality of informational sheets or layers that may be printed with fixed or variable information.

In one exemplary embodiment, a label assembly is described and includes a base layer, having an adhesive disposed over all or substantially all of a surface area for affixing to an article. The label assembly is provided with at least one informational layer stacked on the base layer, with the at least one informational layer having at least one of fixed or variable printed information. At least one RFID device is associated with at least one of the base layer or plurality of informational layers. The base layer and subsequent informational layers are permanently bound by an adhesive disposed proximate at least one edge of at least one of the base layer or the informational layers and the surfaces of the informational layers are configured to repeatedly peel apart and reseal, other than where permanently bound by the adhesive.

In a still further aspect of the present invention a method for producing a label assembly is described and includes the steps of initially providing a web of material with the web having an adhesive and release liner, and then advancing the web of material to a first die station and die cutting the web of material into individual layers. Next, the adhesive of the web is covered with a paper stock and the web is laminated to a liner material. The web is then slit and the individual layers are assembled into a stack to create a label assembly. Next a web containing a plurality of RFID devices is provided and at least one stack is placed onto at least one RFID device. The at least one stack is advanced with the at least one RFID device to a testing and encoding station and the RFID device is tested and encoding information to the RFID device relating to a consumer good. Finally, the label assemblies with RFID devices are collected and applying the label assemblies to an article.

In a still further embodiment of the present invention, a label assembly is described and includes a base layer, with the base layer having an adhesive disposed over all or substantially all of a surface area for affixing to an article. A plurality of informational layers is stacked on the base layer, with the plurality of informational layers each having at least one of fixed or variable printed information areas and the fixed areas is produced in at least two different languages. The base layer and subsequent informational layers are permanently bound by an adhesive disposed proximate at least one edge of at least one of the base layer or the informational layers and the surfaces of the plurality of informational layers are configured to repeatedly peel apart and reseal, other than where permanently bound by the adhesive.

Other features and advantages of the present invention will become apparent to those skilled in the art from the following detailed description. It is to be understood, however, that the detailed description of the various embodiments and specific examples, while indicating preferred and other embodiments of the present invention, are given by way of illustration and not limitation. Many changes and modifications within the scope of the present invention may be made without departing from the spirit thereof, and the invention includes all such modifications.

BRIEF DESCRIPTION OF THE FIGURES

Advantages of embodiments of the present invention will be apparent from the following detailed description of the exemplary embodiments. The following detailed description should be considered in conjunction with the accompanying figures.

DETAILED DESCRIPTION OF THE INVENTION

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

As used herein, the word "exemplary" means "serving as an example, instance or illustration." The embodiments described herein are not limiting, but rather are exemplary only. It should be understood that the described embodiment are not necessarily to be construed as preferred or advantageous over other embodiments. Moreover, the terms "embodiments of the invention", "embodiments" or "invention" do not require that all embodiments of the invention include the discussed feature, advantage or mode of operation.

According to at least one exemplary embodiment, and generally referring to the figures, a method and apparatus for producing peel and reseal label base rolls in one pass may be described as well as the resulting label assembly produced in accordance with the method and apparatus. In some exemplary embodiments, the label assembly may include a scalable number of layers capable of opening and closing. The opening and closing capabilities may be neutral or near neutral in resistance and may be capable of repeated openings without losing the peel and reseal properties. Preferably, the layers of the label construction and the peel and reseal aspects thereof should perform for about ten openings and closings or resealings.

Figure 1:
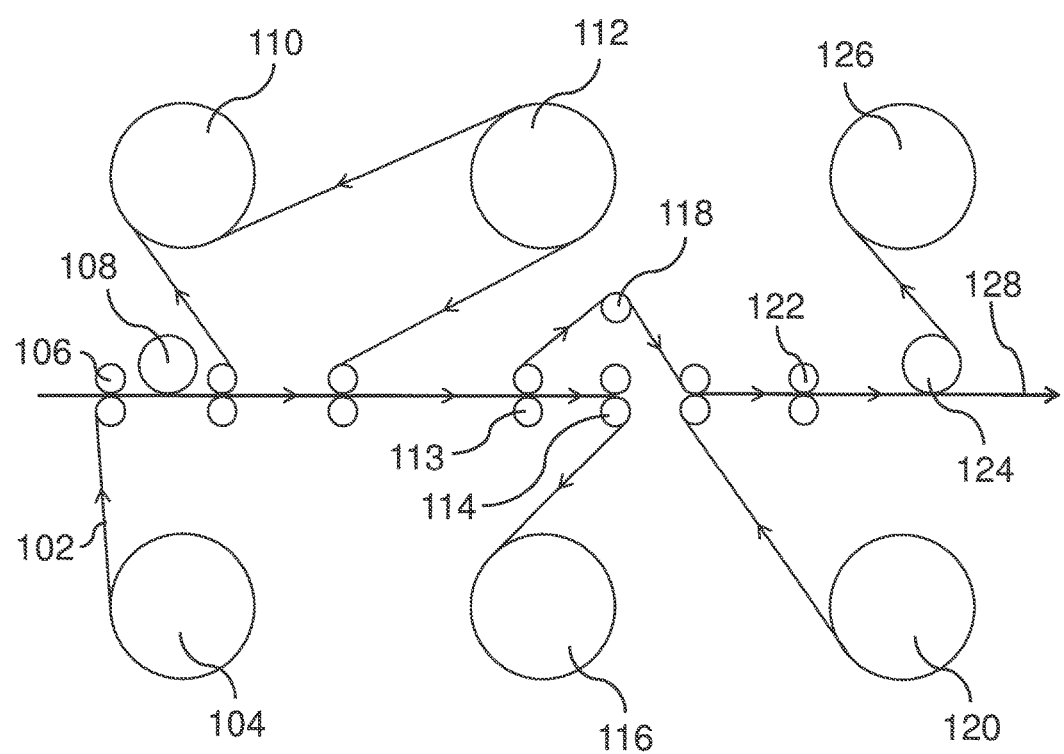
FIG. 1 shows a process and web diagram presenting a manufacturing method for producing a label assembly of the present invention.

Referring now to exemplary FIG. 1, a peel and reseal label base roll producing apparatus 100 may be provided. Transfer tape 102 may be in-fed from a first in-feed position 104. Transfer tape 102 may optionally have an adhesive layer disposed on its surface. The adhesive layer may, for example, be a permanent pressure sensitive adhesive. One exemplary permanent pressure sensitive adhesive may be S490 available from Avery Dennison Corporation. However, other adhesives may be used, as would be understood by a person having ordinary skill in the art. The dimensions of transfer tape 102 may vary, as desired, and may be dependent on individual apparatus 100 attributes and capabilities. In some exemplary embodiments, transfer tape 102 may have a width of approximately 166 mm. The transfer tape 102 web coming from the infeed position may optionally be pre-printed with desired content. Transfer tape 102 may be progressed through an edge guide roll 106 to a first die station 108. At first die station 108, a top liner, such as a release liner, of transfer tape 102 may be cut or slit, revealing an adhesive layer. In an exemplary embodiment, a release liner may be a silicone-coated liner or other suitable liner, as would be understood by a person having ordinary skill in the art. An engraved fixed kiss cutting die cutter or slitting tool may be utilized to perform the cut or slit at die station 108. A pattern formed by the cut or slit at die station 108 may be conformed to any desired permanent adhesive specifications.

In some exemplary embodiments, the permanent adhesive may create a permanent or substantially permanent adhesive stripe that may run along an edge of a label, for example, in a machine direction. When a label assembly is formed, the adhesive stripe may allow multiple layers of labels to be secured together along an edge of the labels. In an exemplary embodiment, a base label layer of a label assembly may have adhesive covering all or substantially all of the surface area for attaching to an article. This may facilitate permanently adhering the label assembly to an article. Alternatively, the base layer of the label assembly may be provided with a removable adhesive to allow for easy removal of the label or a frangible adhesive such that upon separation from the article to which it is attached, the label assembly may not be reattached and the coated area may no longer be tacky to the touch.

As used herein, the term "machine direction" may refer to the direction of web travel through the machine from the unwinding of the beginning material to the collection of the web(s). For example, there may be four adhesive stripes across a web, or any other number, as desired depending on the final configuration of the product to be assembled or capability of the machine manufacturing the product. Additionally, in some exemplary embodiments, one or more of the permanent adhesive stripe or stripes may act as a spine of a peel and reseal label, similar to a spine of a book, magazine or the like.

Still referring to exemplary FIG. 1, after a top liner is slit, the liner 110 as well as any matrix material may be removed and rewound, for example, as waste or may be collected for recycling. The removal of the liner may uncover and reveal the adhesive stripes, as described above, in a face-up fashion. In some exemplary embodiments, the adhesive stripes may be approximately 5 mm in width.

A removable paper stock 112 may be peeled off the liner and rewound. In an exemplary embodiment, the removable paper stock 112 may be, for example, a low tack ultra removable paper stock. Further, it may be noted that the web width may any other desired dimension. In an exemplary embodiment, the web width may, for example, be approximately 160 mm. Then the transfer tape 102 may be over laminated, such that an exposed adhesive side of the removable paper stock 112 covers the transfer tape 102 with the exposed permanent adhesive stripes.

Further, and still referring to exemplary FIG. 1, the web may be progressed with rollers 113 to a nip point 114. After the nip point 114, any remaining transfer tape liners 116 may be peeled off, for example from the bottom, and may then be rewound and collected for recycling. Both liners may be removed at this time. Additionally, as the paper stock may utilize an ultra-removable adhesive, the liners may release in a desired fashion from the paper stock face material.

After the liners from the bottom of the assembly have been peeled away, the web may be taken over a roller 118, for example a plasma or other non-stick coated roller, and may subsequently be laminated onto a new liner 120. The new liner 120 may be fed in from a second in-feed position. In some exemplary embodiments, the new liner utilized herein may be a waste product recovered from other formation processes or may be virgin material.

Next, in a further exemplary embodiment, the web may be progressed through a nip roll 122. The web may further be progressed to a die cutting or other cutting or slitting unit 124 and die cutting or slitting may take place. After die cutting, matrix waste 126 may be removed and the desired label web 128 may be formed and collected. As such, it may not be necessary to utilize machine direction register for the exemplary embodiments described herein. Instead, a cross register may be utilized to allow for the permanent adhesive to be positioned on, for example, a downward, left side of a die cut label to potentially form the spine or edge of the label construction. The web may then be slit or cut into two labels, up formatted, and then rewound using a rewinder, for example a turret rewinder.

Figure 1A:
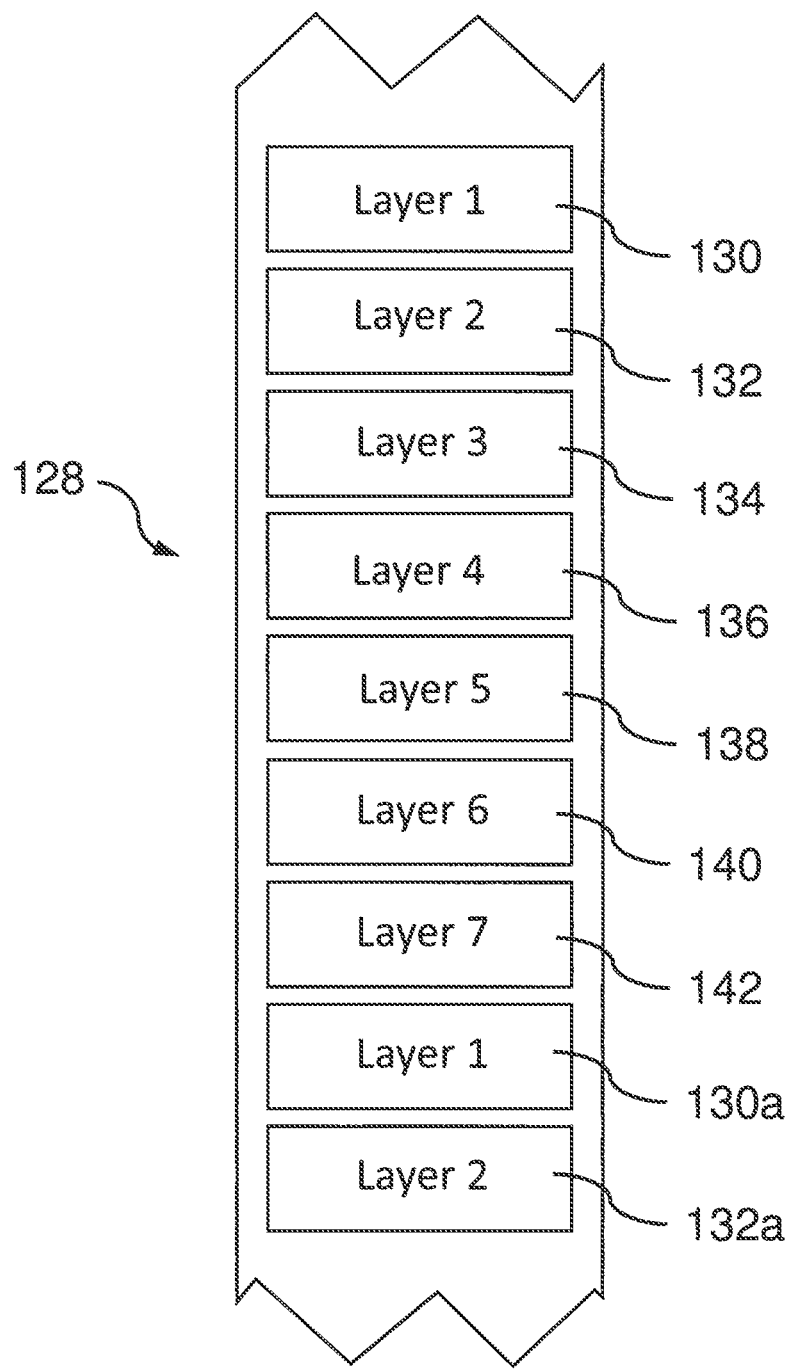
FIG. 1A depicts the web assembly created by the manufacturing method of FIG. 1.

Now referring to exemplary FIG. 1A, a web 128 may be provided after completion of the die cutting of the manufacturing process performed in accordance with the description of FIG. 1. The web may include a number of separate label layers 130, 132, 134, 136, 138, 140, 142, 130A, 132A. The web 128 configuration shown in exemplary FIG. 1A may provide for a seven layer label assembly. The layers may repeat on web 128 in accordance with a desired number of assemblies for a production run. Each of the layers 130-142 may have decreasing corner radii in at least one corner, as later described and shown in exemplary FIGS. 2-2B. The decreasing corner radii of each layer may facilitate separating, or peeling back, the layers from successive layers in the label assembly. The sheets or layers may also be provided with an adhesive pattern, as described above, to facilitate the sheets being formed into a stack to create the label assembly. In some exemplary embodiments, the sheets or layers may be layered using a post finishing label applicator.

The fixed and/or variable information to be presented on a label assembly may be printed onto individual layers when in base roll form. Once printed, individual layers or sheets may be collected on a vacuum tamp/suction pad and readied for further processing.

Figure 1B:
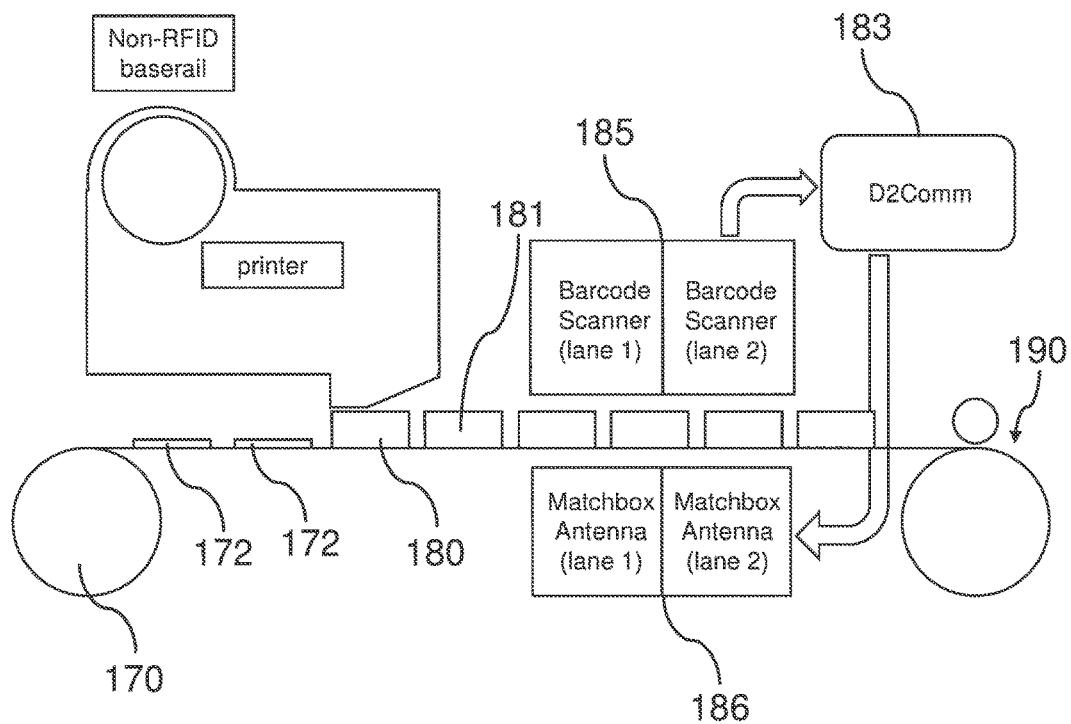
FIG. 1B provides a schematic for the assembly of the label assembly with RFID devices.

Now referring to exemplary FIG. 1B, RFID devices may be added to a label assembly. In an exemplary embodiment, the RFID devices may be "wet inlays," which include a pressure sensitive coating on the inlay such that it can be readily adhered to a surface. The RFID devices or wet inlays may be provided on a first web 170. The RFID devices 172 may be advanced in a machine direction and may be tested before proceeding to a tamp assembly point 180. At the tamp assembly point 180 a first layer may be placed over an RFID device 172 and the process may be repeated or alternatively the other layers of a desired label assembly may be overlaid on the first layer.

After completion of a label assembly 181, the label assembly including one or more RFID device may be moved to a station for verification that the RFID device is working and for encoding of the RFID device. The RFID devices on a web may be tested by use of a reader/scanner 185 and antenna assembly 186 to determine if the RFID is communicating adequately. In an exemplary embodiment, reader/scanner 185 may be a barcode scanner. Once an RFID device is determined to be operational, information may be encoded to the RFID device, and such information may be stored on and transmitted from a database 183. If defective devices are located on the web, the areas containing the defective devices may be marked and can be removed from the web and discarded so that they do not become part of a finished assembly. The database may retain an additional amount of encoding information so that it can replace defective devices or assemblies that are removed from the web.

Next, after the web and the RFID devices have been tested, the web may be slit/cut into individual assemblies and collected at 190. From this point, the roll or web of collected labels may be transported to a manufacturing location and the label assemblies may subsequently be adhered to desired articles, such as a plurality of consumer goods.

Figure 2:
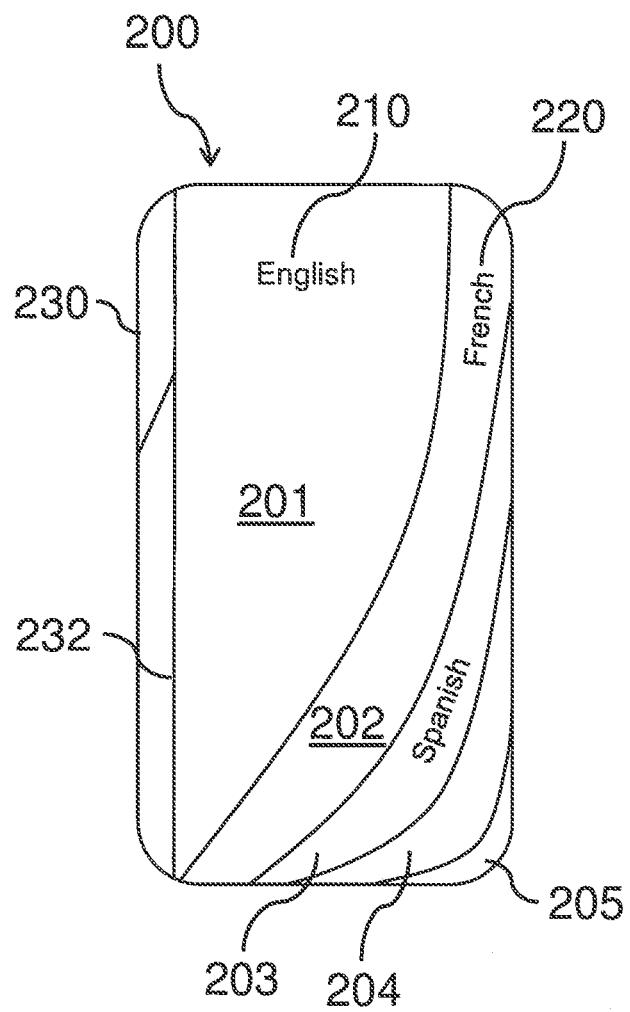
FIG. 2 shows a label assembly that may be produced by the system and described techniques.

Referring now to exemplary FIG. 2, a peel and reseal label assembly 200 may be shown. The label assembly 200 may be composed of multiple plies. In an exemplary embodiment, label assembly 200 may include plies 201, 202, 203 and 204, each of which may be of the same dimensions as the other plies or alternatively may have different dimensions based on the particular requirements of the end user application. In addition, the sheets, layers or plies may have one or more corners with decreasing radii as will be described herein.

Each ply of the label assembly 200 may be provided with indicia or printed material. The indicia may optionally be fixed and/or variable indicia. Each ply 201, 202, 203, 204 of a label assembly 200 may, for example, include the same information written in different languages such as English 210, French 220, and otherwise, as would be understood by a person having ordinary skill in the art. Exemplary information may include care information for a garment, flammability or fire details, ingredients for a consumer food product, directions of use for a consumer good, compliance or sustainability information or any other information desired to be included on a label assembly.

The sheets or plies may be supported by a back panel 205 which may also have information printed thereon. In an exemplary embodiment, a label assembly 200 may be bound along a side edge 230, such as through the use of adhesive which may keep the entire label assembly 200 structure together. It should be understood that while the assembly is shown as being bound along a side edge it may alternatively be bound along a top or bottom edge or a combination of edges. If multiple sides are jointed together, a label assembly 200 may be provided with a fold line 232 or alternatively, a tear opening feature to remove a marginal edge and allow the assembly to be opened or the individual sheets or plies to be separated from the stack. Alternatively, a base/back ply or sheet may optionally be a wet RFID inlay to support the stack.

Still referring to exemplary FIG. 2, a label assembly 200 may have any number of layers, for example, between two and seven separate layers of the assembly. The label assembly 200 may not exceed a size, thickness, or otherwise have properties that would prevent processing through label printers and applicators that might be present in a manufacturing location. That is, the thickness must be less than the maximum thickness of a label stock material to pass through a nip in a printer, such as between the feed mechanism and the print head of a printer so as not to cause jams in the system.

Figure 2A:
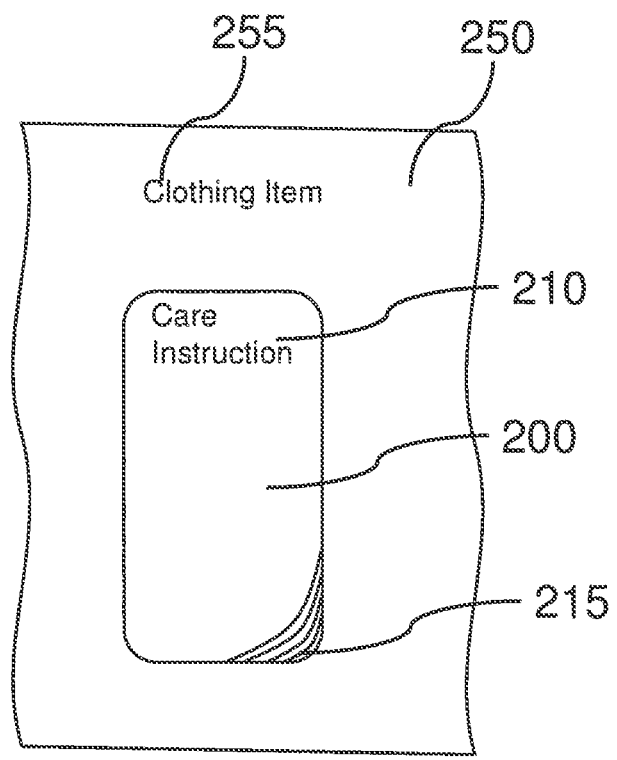
FIG. 2A provides the label assembly of the present invention attached to a consumer good.

Now referring to exemplary FIG. 2A, a label assembly 200 may be attached to a consumer good 250, such as an item of apparel, garment or accessory therefor 255. In this example, the label assembly 200 may be present care instructions 210, those related to cleaning or storage of a garment or apparel item. A top ply or layer may, for example, be printed in the English language. Label assembly 200 may also include scalloping or reduced radii corners 215 of the label assembly, as described below in relation to exemplary FIG. 6. The label assembly may also include variably printed information such as serial numbers, lot numbers, bar codes or the like which when used with RFID can be used to match the printed information to the encoding of the RFID device.

As mentioned previously, the printing or imaging that may be provided on the individual sheets or plies of a label assembly may optionally include static or fixed printing. Fixed printing may not change from sheet to sheet, such as may be the case with size information or care label symbols in connection with a garment or apparel item. Variable printing may change from sheet to sheet, such as may be necessary with printing information in different languages or printing different statutory or regulatory requirements that may appear in certain jurisdictions.

Figure 3:
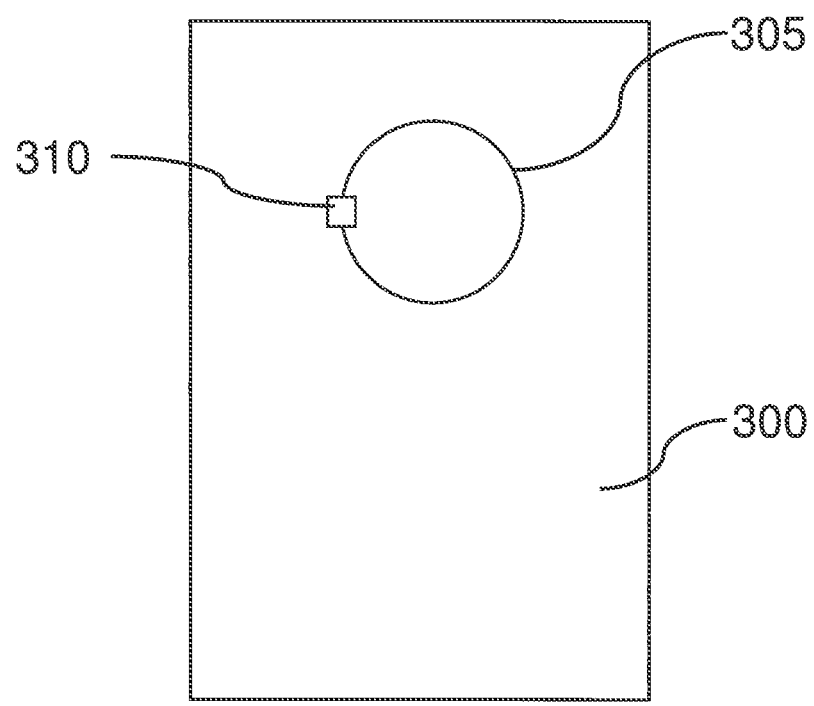
FIG. 3 presents a further illustration of a layer of the label having a RFID device with antenna.
Figure 4:
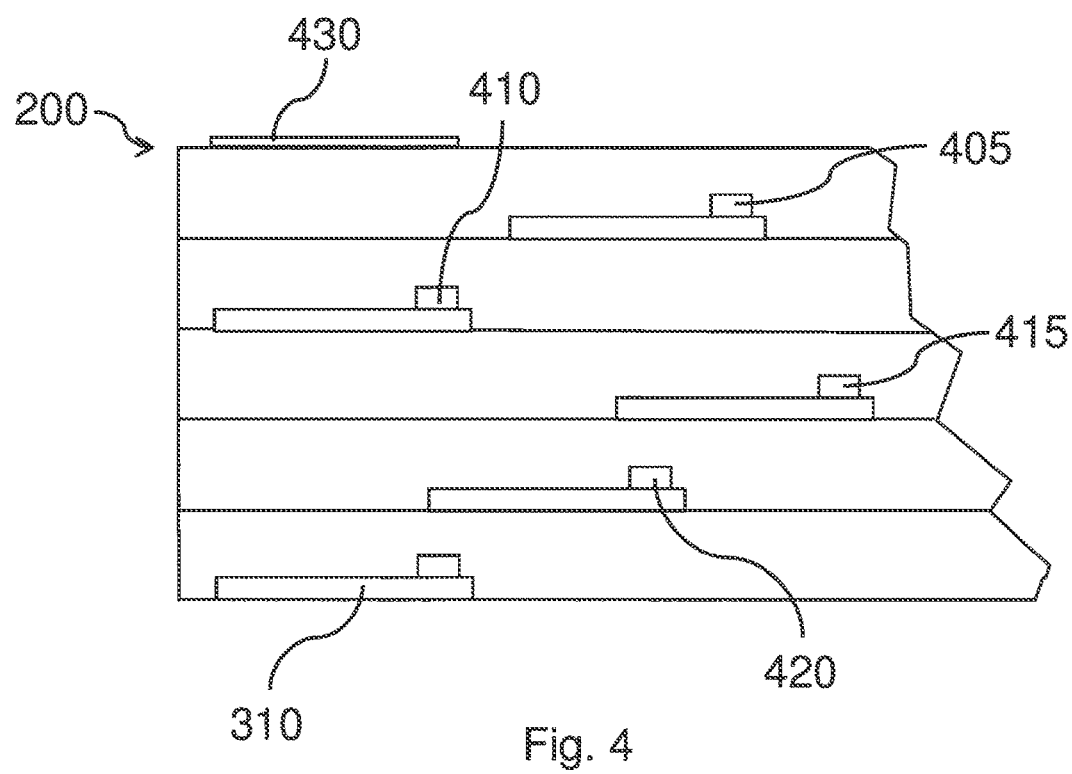
FIG. 4 provides a cross sectional view of a plurality of layers of the label with each layer having a RFID device.

Referring to exemplary FIGS. 3 and 4, a variety of antenna assemblies may be included in label assemblies. A far field antenna 305 may be included in the base layer 300 of a label structure and the far field antenna 305 may have a chip 310 with a first ID. A series of near field elements 405, 410, 415 and 420 in other layers of a label may couple to the central loop 310 of the first RFID device antenna in the base layer 300 of the label, thereby adding subsequent identities to the stack. The near field elements 405, 410, 415 and 420 may be arranged to be substantially co-axial when the labels are stacked but may alternatively be splayed out of alignment, as shown in FIG. 4. The near field elements 405, 410, 415 and 420 and the far field antenna 305 may be arranged so that the tuning of the composite stack is a desired frequency, e.g. in the UHF, HF, LF frequency ranges.

The label assembly 200 may also be printed with a scannable code 430 by which a user can read the code via a smart device and then download the information that is linked to the label assembly. In some exemplary embodiments, a scannable code 430 may be, for example, a barcode. By scanning a code, a user may download, for example, care instructions about a garment to the user's device. Other exemplary download information may include sustainability information and activity in connection with the manufacture of the item to which the label assembly 200 has been attached. In this example, if a label assembly 200 is attached to a garment one may be able to check on the labor conditions of the manufacturing facility where the garments were produced as well as the source of materials (e.g. fibers, dyes, etc.) that may make up the particular garment, as well as the packaging and trim products associated with the garment.

Figure 5:
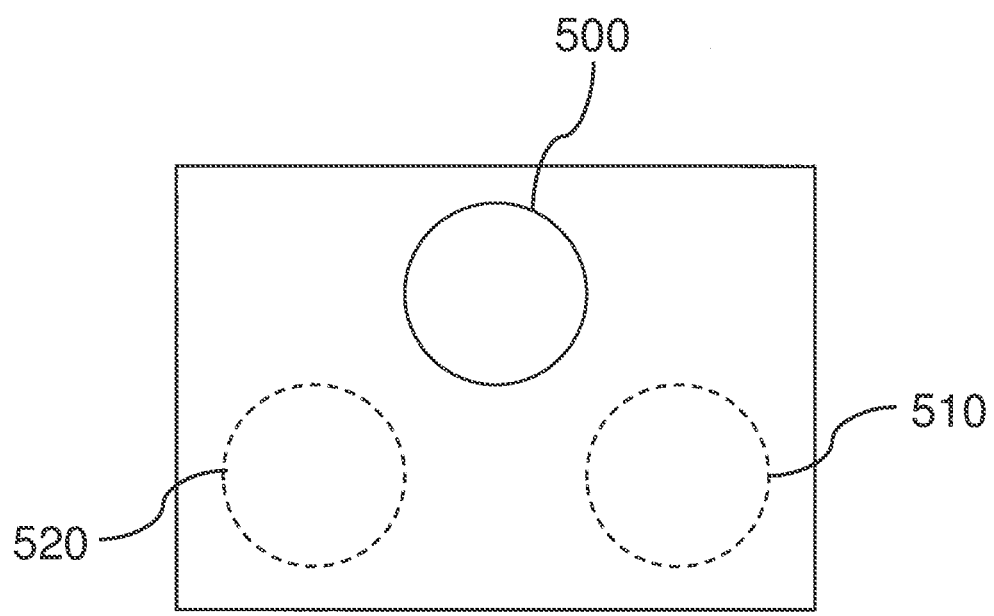
FIG. 5 illustrates an alternate arrangement of the far field antenna structure and the near field antenna(s) in the other layers of the label.

An alternative arrangement of a far field antenna structure 500 and near field antennas 510 and 520 in other layers of a label assembly may be provided in exemplary FIG. 5. The base layer of the label assembly may have a series of coupling positions where near field devices in other layers of the label assembly may be linked to form the composite identity far field device. As previously noted, the tuning and location of the positions related to the common antenna may be arranged to give a desired operating frequency for the stack.

Figure 6:
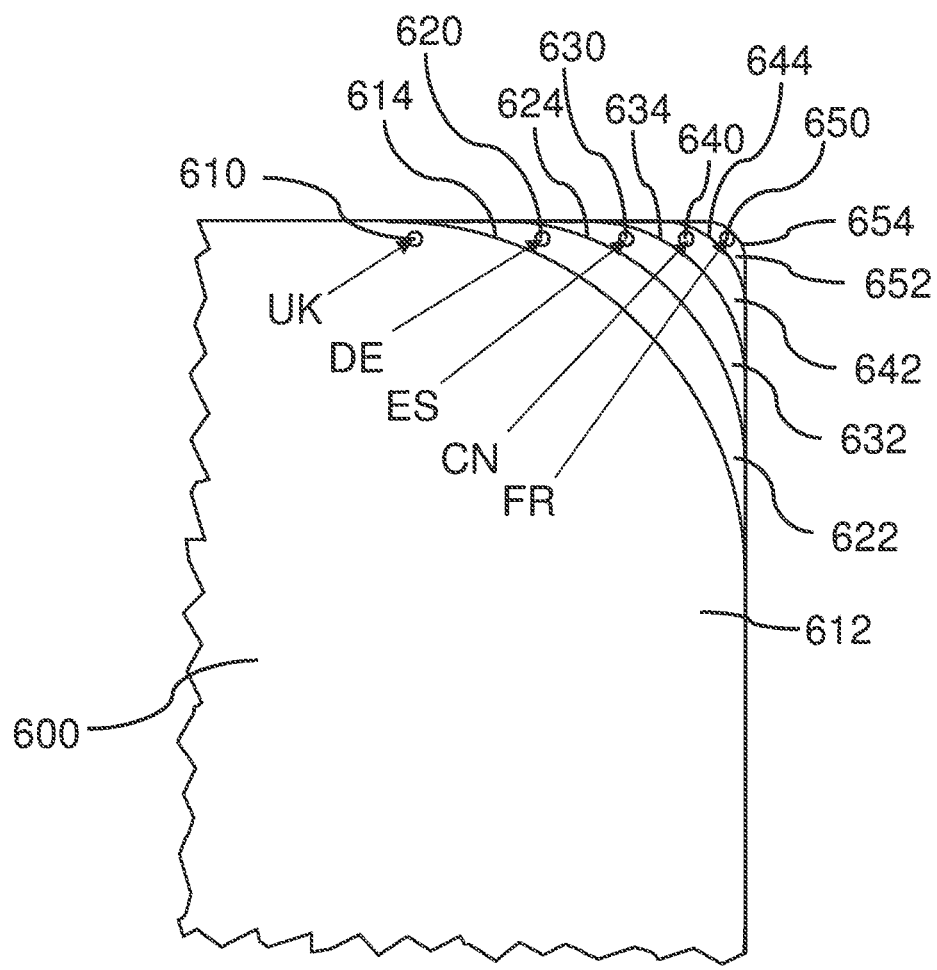
FIG. 6 shows a further embodiment of the label assembly of the present invention.

Referring to exemplary FIG. 6, a label assembly 600 may include a number of individual sheets, plies, or layers 612, 622, 632, 642 and 652. Individual sheets may include sheet indicators. In exemplary embodiments where individual sheets may have information presented in different languages, a language indicator 610, 620, 630, 640 and 650 may be provided on each sheet. For example, as shown in exemplary FIG. 6, different languages may be designated as English (UK), German (DE), Spanish (ES), Chinese (CN) and French (FR). However, it may be understood by a person having ordinary skill in the art that sheet, or layer, indicators may be used for any desired print material displayed on the sheets. Through use of the sheet indicators, a user may quickly select a desired sheet and read the information that has been provided.

Exemplary FIG. 6 may also show a decreasing corner radius of each ply or sheet, 614, 624, 634, 644 and 654, which may enable a user to quickly select a particular sheet or ply having the relevant language or instructions. The decreasing corner radius may optionally be provided on only one corner of the assembly, but in alternative embodiments the decreasing corner radius could be present on multiple corners of the label assembly. The amount that the corners decrease may generally be equal in size but can be varied in the stack depending on the preferences of the end user or equipment capabilities.

In the exemplary embodiments described herein, base rolls may be ready for processing by a service bureau and the service bureau may print as standard using a sequential format, incrementing each portion of the web from the base roll. For example, if it is desired to make a seven page label, the method and system described herein may print all seven labels sequentially and class or collect the seven labels as one, or a single label. The seven sequential labels may be layered on top of each other using a post finishing label applicator.

Further, in some exemplary embodiments, approximately 100 layers may be applied per minute onto a wet inlay such as an RFID inlay. RFID inlays may be any RFID inlays as desired, such as, but not limited to RFID inlays available from Avery Dennison. In embodiments having wet inlays, the wet inlays may be any desired type, for example "AD38x" Narrow edge leading inlays. These inlays may be on pitch in both cross and machine direction, for example approximately 60 mm in the machine direction and approximately 40 mm in the across direction, although it may be appreciated that any other dimensions may be utilized, as desired. Additionally, encoding of the RFID inlays may be performed at a layer/application, or in any other fashion, as desired. In an exemplary embodiment, steps may be performed in one-up, two-up or any desired fashion as may be feasible.

RFID inlays as used herein may include a substrate, e.g. paper or plastic (PET), on which an antenna may be formed from a conductive material such as aluminum and a chip may be connected to pre-defined leads of the antenna to form a connection. The chip may be connected via a strap or other frame assembly.

Printing of the web or label plies may include information that will also be encoded onto the chip of the RFID inlay. Such information might include product information, pricing, bar codes, manufacture dates, ship dates, freshness dates, product compliance or information or any other relevant information that the manufacture or retailer may desire to utilize.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A label assembly, comprising;
    a base layer, the base layer having an adhesive disposed over all or substantially all of a surface area for affixing to an article;
    at least one informational layer stacked on the base layer, the at least one informational layer having at least one of fixed or variable printed information; and
    near field RFID devices associated with each of the informational layers, wherein the near field RFID devices couple with a far field RFID device of the base layer;
    wherein the base layer and subsequent informational layers are permanently bound by an adhesive disposed proximate at least one edge of at least one of the informational layers, and
    wherein surfaces of the informational layers are configured to repeatedly peel apart and reseal, other than where permanently bound by the adhesive.

2. The label assembly of claim 1, wherein each of the informational layers has a corner with a reduced radius from that of the base layer.

3. The label assembly of claim 1, wherein each layer includes printed information in a different language.

4. The label assembly of claim 1, wherein each of the informational layers has a corner with a reduced radius from that of the base layer and any intervening informational layers.

5. The label assembly of claim 1, wherein the informational layers include at least one of care instructions, ingredients, flammability or fire information, statutory or regulatory information.

6. A label assembly, comprising;
   a base layer, the base layer having an adhesive disposed over all or substantially all of a surface area for affixing to an article;
   a plurality of informational layers stacked on the base layer, the plurality of informational layers each having at least one of fixed or variable printed information areas and the fixed areas is produced in at least two different languages and each of the plurality of information layers has a indicator;
   wherein the base layer and subsequent informational layers are permanently bound by an adhesive disposed proximate at least one edge of at least one of the base layer or the informational layers, and
   where at least one far field RFID device is associated with the base layer, and at least one near RFID field device in the informational layers of the label assembly are linked, wherein the near field RFID devices are associated with each of the informational layers; and
   wherein the surfaces of the plurality of informational layers are configured to repeatedly peel apart and reseal, other than where permanently bound by the adhesive.

7. A label assembly as recited in claim 6, wherein at least a portion of the fixed information area further includes garment care instructions.

8. A label assembly as recited in claim 6, wherein the variable printed information includes bar codes or serial numbers.

9. A label assembly as recited in claim 6, wherein the variable printed information includes different languages.

\* \* \* \* \*